Figure 1:
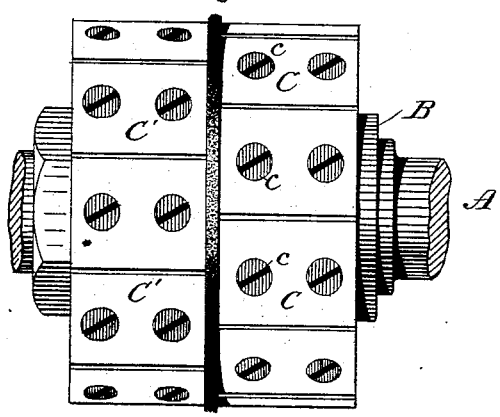

(No Model.)

J. OLMSTED.
DYNAMO ELECTRIC MACHINE.

No. 290,098. Patented Dec. 11, 1883.

ATTEST:
Julian A. Hurdle.
W. Frisby

INVENTOR:
Joseph Olmsted.
per Parker W. Page
Atty.

UNITED STATES PATENT OFFICE.

JOSEPH OLMSTED, OF NEW YORK, N. Y., ASSIGNOR TO THE OLMSTED ELECTRIC LIGHT AND POWER COMPANY, OF SAME PLACE.

DYNAMO-ELECTRIC MACHINE.

SPECIFICATION forming part of Letters Patent No. 290,093, dated December 11, 1883.

Application filed September 7, 1881. (No model.)

*To all whom it may concern:*

Be it known that I, JOSEPH OLMSTED, of New York, in the county and State of New York, have invented certain new and useful Improvements in Dynamo-Electric Machines, of which the following is a specification, reference being had to the drawings accompanying, forming a part thereof.

My invention consists in the combination, with an armature wound with a system of coils connected up to form one continuous conductor, of a commutator having two rows or sets of plates equal in number to the coils on the armature, and alternately connected with the same by means of connecting-wires brought from the loops or portions of conductor intervening between any two adjacent coils.

In mechanical construction the form of commutator which I employ resembles that of others heretofore used in the construction of dynamo-electric machines, but under radically different conditions from those that my invention implies. For example, commutators with plates alternately disposed have been used in conjunction with a system of independent armature-coils, the opposite ends of which were connected to diametrically-opposite commutator-plates, such machines being what are known as "open-circuit machines," and requiring two commutator-plates for each coil. In my improved machine, however, the armature is wound with a number of coils, which are connected up end to end to form a continuous conductor, from which connections are made with the commutator-segments by loops or ends taken off from the junctions of the original by independent coils. This system of winding and connecting requires as many segments on the commutator as there are coils on the armature, so that when the number of coils is large, the segments, as ordinarily made, are required to be very narrow, as also are the spaces between them. From this arises a serious difficulty—that of short-circuiting the coils—which is liable to occur whenever any two adjacent commutator-plates or segments are bridged over, as by particles of metal worn from the brushes or otherwise. This, mainly, it is my object to avoid, and for this purpose I combine with an armature, whether cylindrical or annular, and wound with conductors connected to form a closed-circuit machine, as above stated, a commutator composed of a ring or collar of insulating material, around the surface of which are screwed or set two rows of alternately-disposed plates. It will be understood that other advantages than those named are gained by this means—for instance, the possibility of removing the plates should occasion require, and other advantages incident to this plan of mechanical construction.

In the accompanying drawings, I have illustrated the invention as embodied in a machine of special construction, and for a more specific statement of the invention reference is made to the same.

Figure 2:
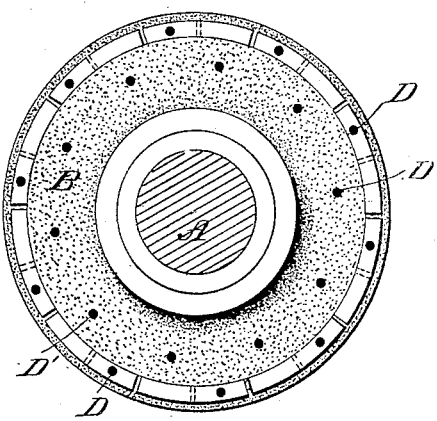

Figure 1 represents in elevation the commutator complete; Fig. 2, a cross-section of the same; and Fig. 3, a diagrammatic illustration of the principle of construction, and the method of connecting the same with the armature.

A is the shaft of the machine, upon which the armature is fixed, and by which also the commutator is designed to be carried.

B is a collar of insulating material—such as ebonite, cement, or hard rubber—suitably secured to the shaft. *b* is a ridge or flange on the said collar, which may be omitted, if so desired, as it serves simply as a dividing-line between the two rows or sets of plates.

C C′ represent the plates or segments, which are composed of brass, and secured to the collar B by screws *c c*, a space being left between, which may be filled with an insulating material, if so desired. The plates of one row or set are secured to the collar in such a manner as to lie opposite the spaces between the others, as shown.

Figure 3:
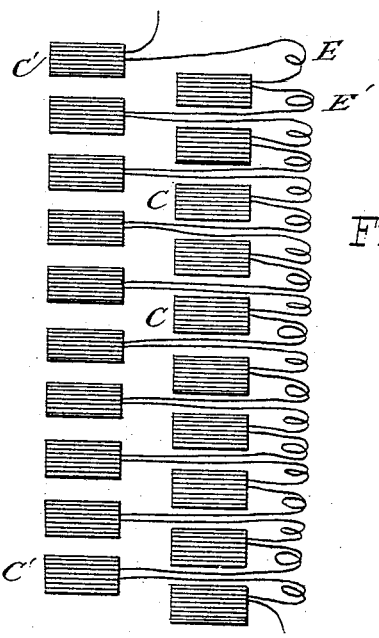

D D′ are wires leading to the strips, the former connecting directly to the inside row, or that nearest the armature, the latter passing through the insulating collar to the other or outside row. The plan of the connections is illustrated in Fig. 3, where E E′ represent the several armature-coils. Between one coil and its next adjacent coil a loop is formed, which is carried out and connected to one, say, of the inside row of plates, the next loop is connected to the next adjacent strip of the outside set, and this plan is continued until all the strips are connected with the loops or ends, the latter being carried from one row to the other alternately, until one half of the loops connect with one set, the other with the other.

Having now described my invention, what I claim as new, and desire to secure by Letters Patent, is—

In a dynamo or magneto electric machine, the combination, with an armature wound with a continuous system of coils, of a commutator having plates equal in number to the coils on the armature, the plates being disposed in two sets or rows, and alternately connected with the loops or portions of conductor joining the coils, as set forth.

JOSEPH OLMSTED.

Witnesses:
PARKER W. PAGE,
W. FRISBY.